Feb. 29, 1944.  C. H. WHITE  2,342,911
TRASH CLEARER
Original Filed June 10, 1940
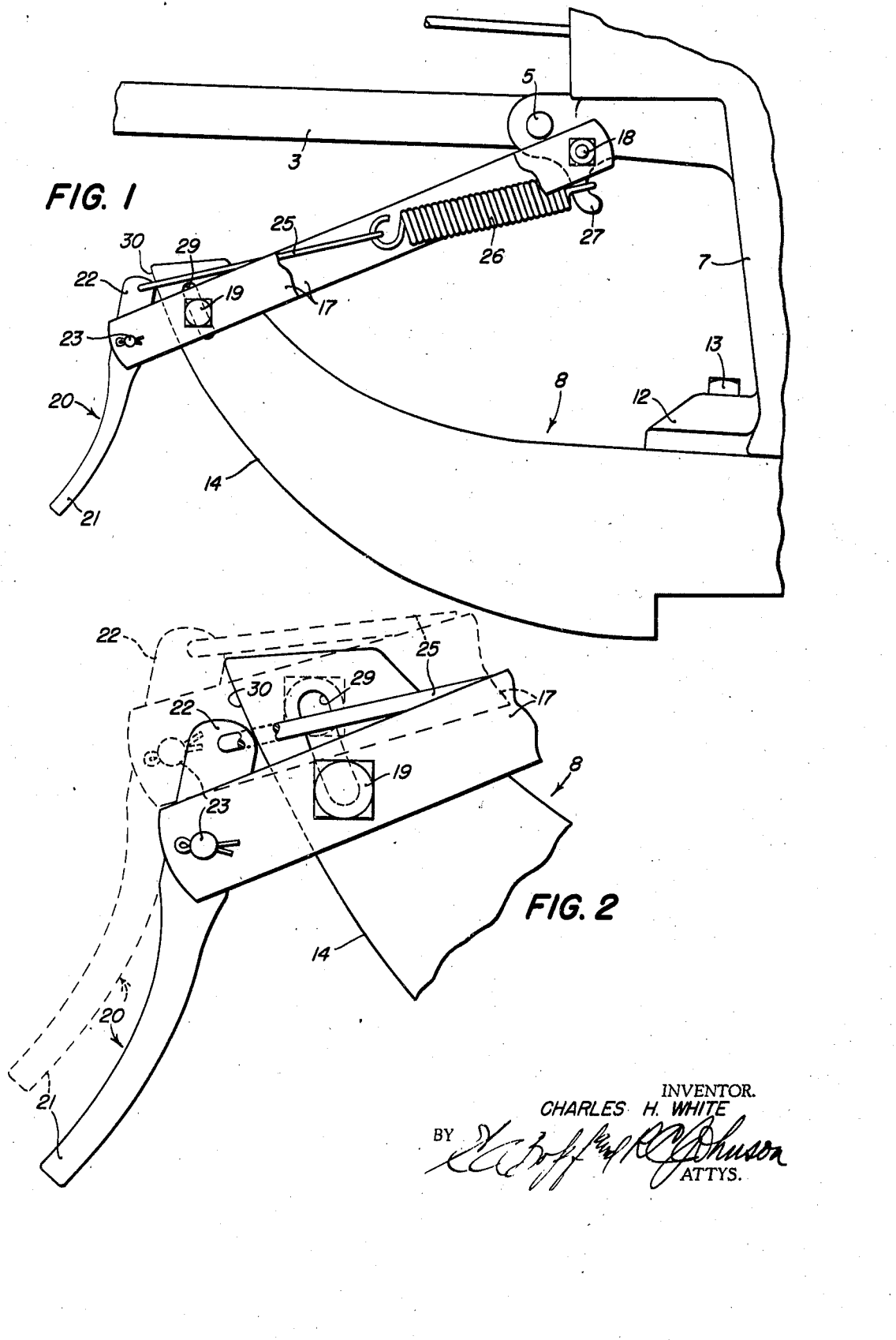

Patented Feb. 29, 1944

2,342,911

UNITED STATES PATENT OFFICE 2,342,911

TRASH CLEARER

Charles H. White, Moline, Ill., assignor to Deere & Company, Moline, Ill., a corporation of Illinois Original application June 10, 1940, Serial No. 339,699. Divided and this application April 17, 1941, Serial No. 389,013

5 Claims. (Cl. 97—194)

This application is a division of my co-pending application, Serial No. 339,699, filed June 10, 1940.

This invention relates generally to planters and more particularly to trash cleaners disposed in front of the planter shoes for turning aside such trash as weeds, roots, cornstalks, and the like, in advance of the runner or other device which opens the seed furrow.

The object and general nature of the present invention is the provision of an improved trash clearing arrangement which comprises a pivoted arm mounted at the front end of the planter furrow opener and held in operating position by spring means that is prestressed, whereby the trash arm does not yield except when it encounters a predetermined resistance. Further, it is a feature of the present invention to provide for adjusting the trash cleaner to operate at different depths, or, conversely, to operate at the same depth regardless of adjustment of the furrow opener for different depths. Also, it is a feature of this invention to provide stop means against which the spring holds the trash arm, which stop means serves to hold the arm in a predetermined position, irrespective of adjustment of the arm relative to the furrow opener.

These and other objects and advantages of the present invention will be apparent to those skilled in the art after a consideration of the following detailed description, taken in conjunction with the accompanying drawing illustrating the preferred form of the invention.

In the drawing:

Figure 1 is a fragmentary side view of a planter in which a trash clearer, constructed according to the principles of the present invention, has been incorporated; and Figure 2 is an enlarged fragmentary view illustrating the manner in which the position of the trash clearer arm and its support may be varied relative to the furrow opener but without causing any variation in the angle at which the arm normally is disposed relative to the ground.

Figure 1 shows a part of the planting unit of an agricultural implement, such as a corn planter. Generally such a planter comprises frame means, which may be the tractor in the case of tractor planters, and usually each planting unit is connected by draft means, such as a pair of links 3 pivoted at 5 to forwardly extending lugs which form a part of the furrow opener shank 7. Various types of furrow openers are in use at the present time, but perhaps the most common type is the type of furrow opener referred to as a sled runner opener, and this is the type of furrow opener that I have shown in the accompanying drawing, as indicated by the reference numeral 8. The furrow opener shank is hollow and accommodates the seed valves and associated mechanism. Usually, the furrow opener shank 7 is provided with a forwardly extending lug 12 by which the furrow opener 8 may be fixed thereto in any suitable manner, as by a bolt 13. A furrow opener of the runner type, as indicated at 8, commonly comprises a forward soil engaging knife section 14 and a rear section that comprises two rearwardly disposed spaced apart plates which run in the furrow opened by the forward section 14 so as to accommodate the deposition of seed in the furrow. The front end of the furrow opener is reenforced by a pair of braces 17 which are bolted, as at 18, to the runner shank 7 and, as at 19, to the front end of the runner 8.

In order to clear away trash, such as corn stalks and other debris, lying on the ground or embedded in the ground closely adjacent the surface, I provide a novel form of trash cleaner or clearer in which a pivoted arm is mounted at the front end of the planter runner and is moved through the soil with its end an inch or so below the surface, thereby pushing to one side any stalks or other debris that might interfere with the proper penetration of the planter runner 14. The trash cleaner or clearer arm is indicated by the reference numeral 20 and comprises a forwardly and downwardly curved section 21 and an upper flattened section 22, the latter being apertured at two points, one to receive a pin 23 by which the arm 20 is pivotally mounted on the forward ends of the braces 17, which thus serve as a supporting arm for the trash clearer arm 20, and the other aperture serving to receive a link 25, which is preferably in the form of an endless loop the rear end of which is engaged by a spring 26. The rear end of the spring is anchored to a lug 27 formed on or carried by the runner shank 7. Mention was made above to the fact that the braces 17 are bolted at 19 to the front end of the runner blade 14. To this end, the runner blade is provided with a slot 29 in which the bolt 19 is disposed. The provision of the slot makes it possible to raise or lower the braces 17, merely by loosening the bolt 19 and moving the braces to their new position. This raises and lowers the position of the trash arm 20 relative thereto. I have found, however, especially for high speed tractor operation, that the arm 20 should be disposed at about the angle shown in Figure 1, and therefore in order to retain this angle even though the braces 17 are raised or lowered relative to the runner blade 14 in order to accommodate different depths of penetration, I have arranged to have the upper end of the arm 20 rest against the forward end of the runner, and I have so shaped the forward end of the runner to form what may be termed a cam section 30, so that regardless of in what position the braces 17 may be disposed, the arm 20 is always held at the proper angle. This action is illustrated in Figure 2 which shows the two extreme positions of the braces 17 and the arm 20. As will be readily understood, the spring 26 exerts a positive force holding the upper end 22 of the arm 20 against the end of the runner 14 at all times. In effect, this provides a prestressed trash cleaner which normally remains in the position shown, yet if an abnormal obstruction is encountered, the spring 26 yields.

The operation of the planter with the trash cleaning attachment, as described above, is substantially as follows:

As the planting machine is drawn through the field the forwardly and downwardly curved section 21 of the arm 20 serves to lift trash and push the same to one side of the runner 8. The trash clearer arm, being prestressed as described above, normally remains in the position shown, at the proper downward and forward inclination to lift the trash and push the same to one side of the runner. If the arm were not prestressed, its angular position might continually vary and it might be moved into a position in which it would tend merely to push trash ahead rather than discharge the same by pushing it upwardly and to one side of the runner. The trash clearer arm may be adjusted for different depths of penetration by loosening the bolt 19 and moving the braces 17 so as to dispose the trash cleaner in the position desired. The end of the runner blade 14 is shaped so that during this adjustment the angle of the trash cleaner arm with respect to the ground is not appreciably changed.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a planter, a furrow opener having a slot at its forward end, a shank to which said furrow opener is fixed at its rear end, a brace connected at its rear end to said shank, bolt means extending through said slot and serving to connect the forward end of said brace with the forward end of said furrow opener, a trash arm pivoted to the forward end of said brace, and spring means anchored at its rear end to said shank and at its forward end to the upper end of said arm for yieldingly holding the latter in its trash engaging position, said spring means holding the upper end of said arm against the forward portion of said furrow opener when the arm is in said one position and said furrow opener being shaped so that said arm is held in the same angular position relative to the furrow opener irrespective of variations in the position of said brace relative to the furrow opener, as permitted by the disposition of said bolt means.

2. In a planter, a furrow opener, supporting means adjustably mounted on said furrow opener, a trash clearer arm movably mounted on said supporting means and movable with the latter relative to said furrow opener, biasing means serving to hold said trash clearer arm in operating position, and cam means cooperating with said trash clearer arm for limiting the movement of the latter by said biasing means, said cam means being shaped so that said arm is disposed in substantially the same angular position relative to the furrow opener irrespective of the position of said supporting means relative to said furrow opener.

3. In a planter, a furrow opener, a trash clearer mounted for generally vertical adjustment relative to said furrow opener and normally disposed at a given angle relative to the surface of the ground, and means responsive to movement of the trash clearer relative to said furrow opener for maintaining said angle constant during generally vertical adjustment of said trash clearer.

4. In a planter, a furrow opener, a trash clearer mounted for generally vertical adjustment relative to said furrow opener, resilient means acting against said trash clearer for urging it in one direction, and cam means serving to limit the movement of said trash clearer by said resilient means, said trash clearer being movable relative to said cam means during adjustment of said trash clearer, said cam means being shaped so that the angle that the trash clearer makes with respect to the ground surface remains substantially the same in any position of adjustment of said trash clearer.

5. In a planter, a furrow opener, a trash clearer cooperating therewith, an arm to which said trash clearer is movably connected, means adjustably fixing said arm to said furrow opener so as to dispose said trash clearer in different positions, means biasing said trash clearer for movement relative to said arm in one direction, and means acting against said trash clearer during movement of said arm and trash clearer and cooperating with said biasing means for holding the trash clearer in the same angular position relative to said furrow opener notwithstanding the change in the position of said arm.

CHARLES H. WHITE.